United States Patent
Jang et al.

(10) Patent No.: US 8,080,343 B2
(45) Date of Patent: Dec. 20, 2011

(54) FUEL CELL HAVING HYDROGEN STORAGE TANK AND HYDROGEN GENERATOR WITH ALKALINE SOLUTION

(75) Inventors: Jae Hyuk Jang, Gyunggi-do (KR); Young Soo Oh, Gyunggi-do (KR); Sung Han Kim, Gyunggi-do (KR); Jae Hyoung Gil, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 1216 days.

(21) Appl. No.: 11/812,700

(22) Filed: Jun. 21, 2007

(65) Prior Publication Data

US 2008/0152971 A1 Jun. 26, 2008

(51) Int. Cl.
*H01M 8/06* (2006.01)
(52) U.S. Cl. ............... 429/420; 429/416; 429/417
(58) Field of Classification Search .......... 429/416, 429/421, 417
See application file for complete search history.

(56) References Cited

U.S. PATENT DOCUMENTS

| | | | |
|---|---|---|---|
| 6,544,400 B2 * | 4/2003 | Hockaday et al. | 205/338 |
| 7,803,349 B1 * | 9/2010 | Muradov | 423/657 |
| 7,816,051 B2 * | 10/2010 | Eun et al. | 429/460 |
| 2001/0039759 A1 | 11/2001 | Sato et al. | |
| 2004/0086755 A1 * | 5/2004 | Kalal | 429/19 |
| 2004/0166385 A1 * | 8/2004 | Morse et al. | 429/19 |
| 2005/0042165 A1 | 2/2005 | Akiyama et al. | |
| 2005/0287405 A1 | 12/2005 | Lee | |
| 2007/0237994 A1 * | 10/2007 | Nakai et al. | 429/19 |

FOREIGN PATENT DOCUMENTS

| | | |
|---|---|---|
| DE | 101 23 410 B4 | 11/2008 |
| JP | 9-190874 | 7/1997 |
| JP | 11-111322 | 4/1999 |
| JP | 2002-184436 | 6/2002 |
| JP | 2003-017102 | 1/2003 |
| JP | 2003-346861 | 12/2003 |

(Continued)

OTHER PUBLICATIONS

German Office Action, w/ English translation thereof, issued in German Patent Application No. 10 2007 028 625.4-45 dated Nov. 4, 2010.

(Continued)

*Primary Examiner* — Barbara Gilliam
*Assistant Examiner* — Zachary Best
(74) *Attorney, Agent, or Firm* — McDermott Will & Emery LLP

(57) ABSTRACT

A fuel cell having a hydrogen storage tank, the fuel cell including: a hydrogen generator generating hydrogen by a chemical reaction between an alkaline solution with an alkaline catalyst for hydrogen generation, dissolved in water, and a metallic powder for hydrogen generation; hydrogen storage having a hydrogen occlusion metal to which the hydrogen generated from the hydrogen generator is occluded, to store hydrogen; and power generator receiving hydrogen released from the hydrogen occlusion metal by heat provided to the hydrogen occlusion metal and generating electricity. The hydrogen generator, hydrogen storage tank, and power generator are stacked on one another and are integrally assembled by a plurality of clips, each of which has lower and upper ends fastened to a lower groove formed on a lower surface of the hydrogen generator and to an upper groove formed on an upper surface of the power generator, respectively, exerting strength for integral fixing.

9 Claims, 3 Drawing Sheets

FOREIGN PATENT DOCUMENTS

| | | |
|---|---|---|
| JP | 2004-319213 | 11/2004 |
| JP | 2005-071932 | 3/2005 |
| JP | 2005-243617 | 9/2005 |
| JP | 2006-12811 | 1/2006 |
| JP | 2006-069869 | 3/2006 |
| KR | 646953 B1 * | 11/2006 |
| WO | WO 2006073113 A1 * | 7/2006 |

OTHER PUBLICATIONS

Japanese Office Action issued in Japanese Patent Application No. 2007-163842, dated Dec. 21, 2010.

* cited by examiner

FUEL CELL HAVING HYDROGEN STORAGE TANK AND HYDROGEN GENERATOR WITH ALKALINE SOLUTION

CLAIM OF PRIORITY

This application claims the benefit of Korean Patent Application No. 2006-134122 filed on Dec. 26, 2006, in the Korean Intellectual Property Office, the disclosure of which is incorporated herein by reference.

BACKGROUND OF THE INVENTION

1. Field of the Invention

The present invention relates to a fuel cell having a tank for storage of hydrogen generated, and more particularly, to a fuel cell having a hydrogen storage tank, the fuel cell storing hydrogen generated from a chemical reaction and generating electricity using the stored hydrogen without a separate external heat source.

2. Description of the Related Art

With recent increased use of portable small-sized electronic devices such as mobile phones, personal digital assistants, digital cameras, notebook computers and the like and especially with introduction of digital multimedia broadcasting, small-sized mobile terminals are required to have a power source with improved capability.

Having a capacity equivalent to about two-hour viewing of digital multimedia broadcasting, the generally used lithium ion secondary batteries are undergoing efforts to improve their capacity. However, there has been rising expectation for a fuel cell with further miniaturized size and higher capacity of power for a more fundamental solution.

In general, a fuel cell directly converts chemical energy, generated by oxidizing fuel, to electric energy, which is similar to a general chemical battery in that the principle of oxidation and reduction reaction is utilized. However, there is also a difference in that reactants are continuously supplied into a closed system and continuously exhausted out of the system in the fuel cell unlike a chemical battery in which cell reaction takes place only inside a system.

Known methods of embodying such a fuel cell include a direct methanol method in which hydrocarbon fuel such as methanol is directly supplied to a fuel electrode and a reformed hydrogen fuel cell (RHFC) method in which hydrogen is extracted from methanol and injected into a fuel electrode. The RHFC method uses hydrogen for fuel as in a polymer electrode membrane (PEM) method, which is advantageous in terms of high output, high electric capacity per unit volume and no other reactants besides water, but requires a separate reformer and thus is disadvantageous in terms of miniaturization.

In order for the fuel cell to obtain high power output density, a reformer for converting liquid fuel to gas fuel like hydrogen is required. The reformer includes an evaporating part for gasifying hydrocarbon liquid fuel, a reforming part for converting methanol into hydrogen at 250 to 350° C. through a catalytic reaction, and one of a CO removing part and $CO_2$ removing part for removing byproducts additionally generated during the reforming reaction, i.e., CO gas or $CO_2$ gas.

However, since the reforming reaction entails a heat absorption reaction taking place at a temperature maintained in a range of 250 to 350° C. in the reforming part and heat generation reaction taking place at a temperature maintained in a range of 170 to 200° C. in the CO removing part, a high-temperature system with a complex structure is required for high reaction efficiency. Therefore, the fuel cell has a complicated structure with limitations in reducing the manufacturing costs.

In addition, a separate structure for removing the byproducts generated during the reforming reaction, i.e., CO gas or $CO_2$ gas is required, which limits reduction of the total volume and manufacturing costs of the fuel cell.

International patent publication WO 02/08118 discloses a technology in which a fuel cartridge including caustic soda and aluminum in a container filled with a certain amount of water is disposed to allow hydrolysis of water and aluminum with high-density caustic soda as a catalyst, thereby generating a hydrolysate $Al(OH)_3$ and hydrogen $H_2$ as in following equation 1. The hydrolysate $Al(OH)_3$ bonds with oxygen to become $Al_2O_3$ and adheres to aluminum but is separated from the aluminum by caustic soda, thereby allowing continuous hydrolytic reactions accompanying heat generation as hydrogen generated in the container is supplied to a burner through a pipe and used as a fuel for the burner.

$$2Al+6H_2O \rightarrow 2Al(OH)_3+3H_2 \text{ (catalyst: NaOH)} \qquad \text{Equation 1}$$

However, since the conventional technology requires injecting high density of caustic soda, which is difficult to handle, it is cumbersome and biologically harmful to handle and use the fuel cell.

In addition, when the container placed vertically becomes inclined in a certain angle, the level of water filled in the container is changed and the fuel cartridge is exposed out of the water. This may significantly decrease the amount of hydrogen or stop the hydrogen generation from the reaction of formula 1. Thus, the container should be maintained vertically to have the fuel cartridge immersed in the water at all time, which renders cumbersome handling and use.

Furthermore, since the amount of hydrogen generated from the container is not constant per time, the conventional technology is limited in supplying the hydrogen generated from the container and in stably generating electricity.

SUMMARY OF THE INVENTION

An aspect of the present invention provides a fuel cell having a hydrogen storage tank, the fuel cell storing a certain amount of hydrogen generated from a chemical reaction without a separate external heat source and supplying the stored hydrogen in a regulated manner, thereby stably generating electricity.

According to an aspect of the invention, there is provided a fuel cell having a hydrogen storage tank, the fuel cell including: a hydrogen generator generating hydrogen by a chemical reaction between a certain amount of alkaline solution with an alkaline catalyst for hydrogen generation, dissolved in water, and a certain amount of metallic powder for hydrogen generation; a hydrogen storage having a hydrogen occlusion metal to which the hydrogen generated from the hydrogen generator is occluded, to store a certain amount of hydrogen; and a power generator receiving the hydrogen released from the hydrogen occlusion metal by heat provided to the hydrogen occlusion metal and generating electricity.

The hydrogen generator may include: a first chamber filled with the certain amount of alkaline solution with the alkaline catalyst dissolved in water, the first chamber having a hydrogen outlet formed in an outer surface thereof, corresponding to the hydrogen generator; and a second chamber filled with a certain amount of metallic powder for hydrogen generation, the second chamber having an insertion protrusion inserted into the first chamber when assembled with the first chamber.

The first chamber may have a thin film formed in an outer surface thereof corresponding to the insertion protrusion, the thin film penetrated by force applied to the insertion protrusion.

The alkaline catalyst may be at least one selected from a group consisting of potassium hydroxide, sodium hydroxide, calcium hydroxide and iron hydroxide.

The metallic powder for hydrogen generation may be at least one selected from a group consisting of aluminum, magnesium, silicon and zinc.

The hydrogen outlet may have a vapor-liquid separation film formed therein.

The hydrogen storage may include: a tank having a hydrogen inlet formed in one side thereof, the hydrogen inlet through which high-pressure hydrogen generated from the hydrogen generator is injected by force; a tank cover sealing the one side of the tank and having a hydrogen outlet formed therein; and a heater installed between the tank and the tank cover and providing heat to the hydrogen occlusion metal.

The heater may be formed of heating wires pattern-printed on one of the one side of the tank and one side of the tank cover and connected to an external power source to generate resistance heat.

The power generator includes at least one unit cell, the unit cell including: a membrane electrode assembly formed of an electrolyte membrane with an anode and a cathode attached to opposed sides thereof; anode and cathode separators attached to opposed sides of the membrane-electrode assembly, respectively, the anode and cathode separators having a channel through which hydrogen flows and holes through which air including oxygen flows, respectively; and anode and cathode current collectors disposed between the anode separator and the membrane-electrode assembly and between the cathode separator and the membrane-electrode assembly, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
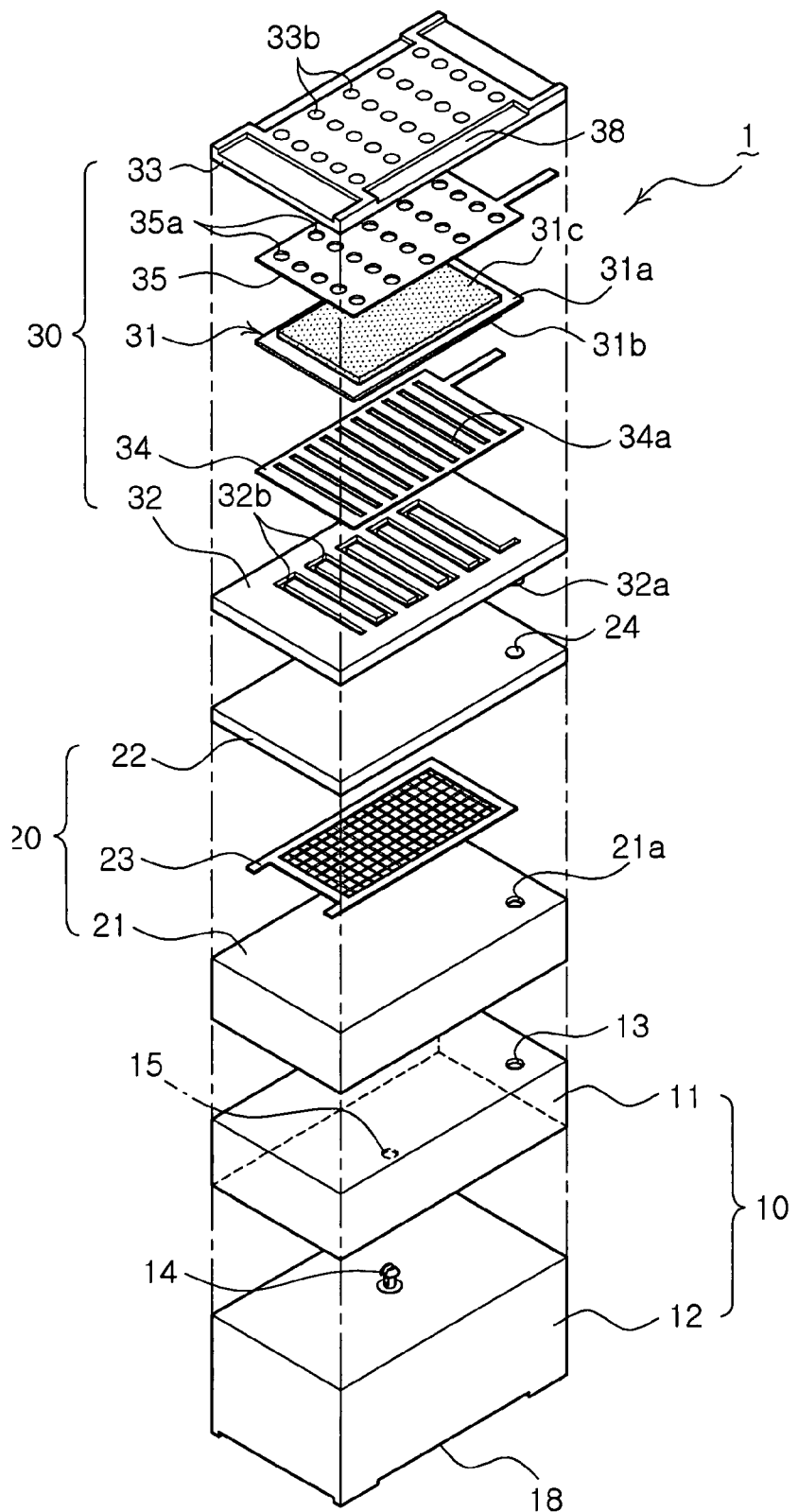
FIG. 1 is an exploded perspective view illustrating a fuel cell having a hydrogen storage tank according to the present invention.
Figure 2:
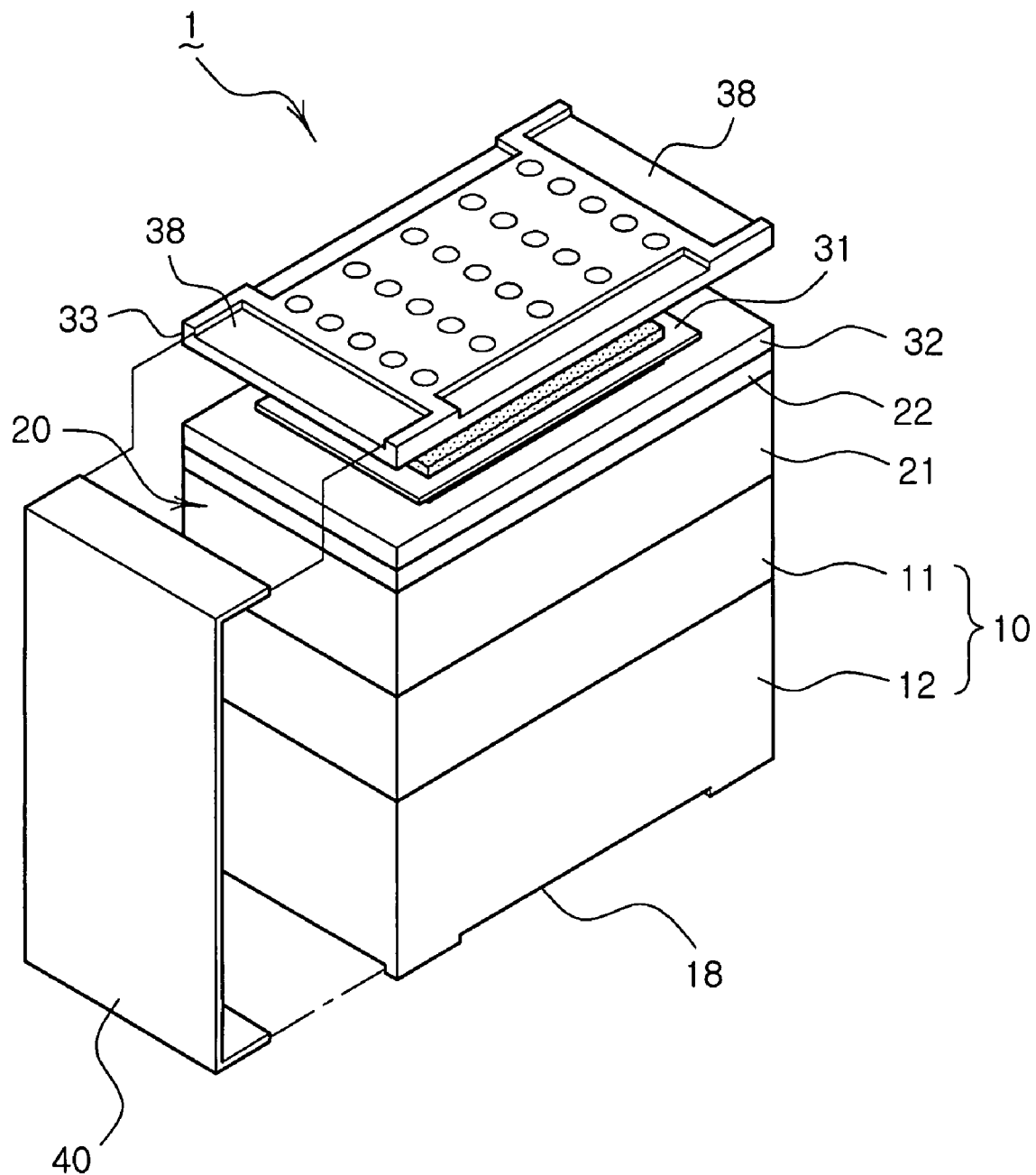
FIG. 2 is an assembly view illustrating the fuel cell of FIG. 1.
Figure 3:
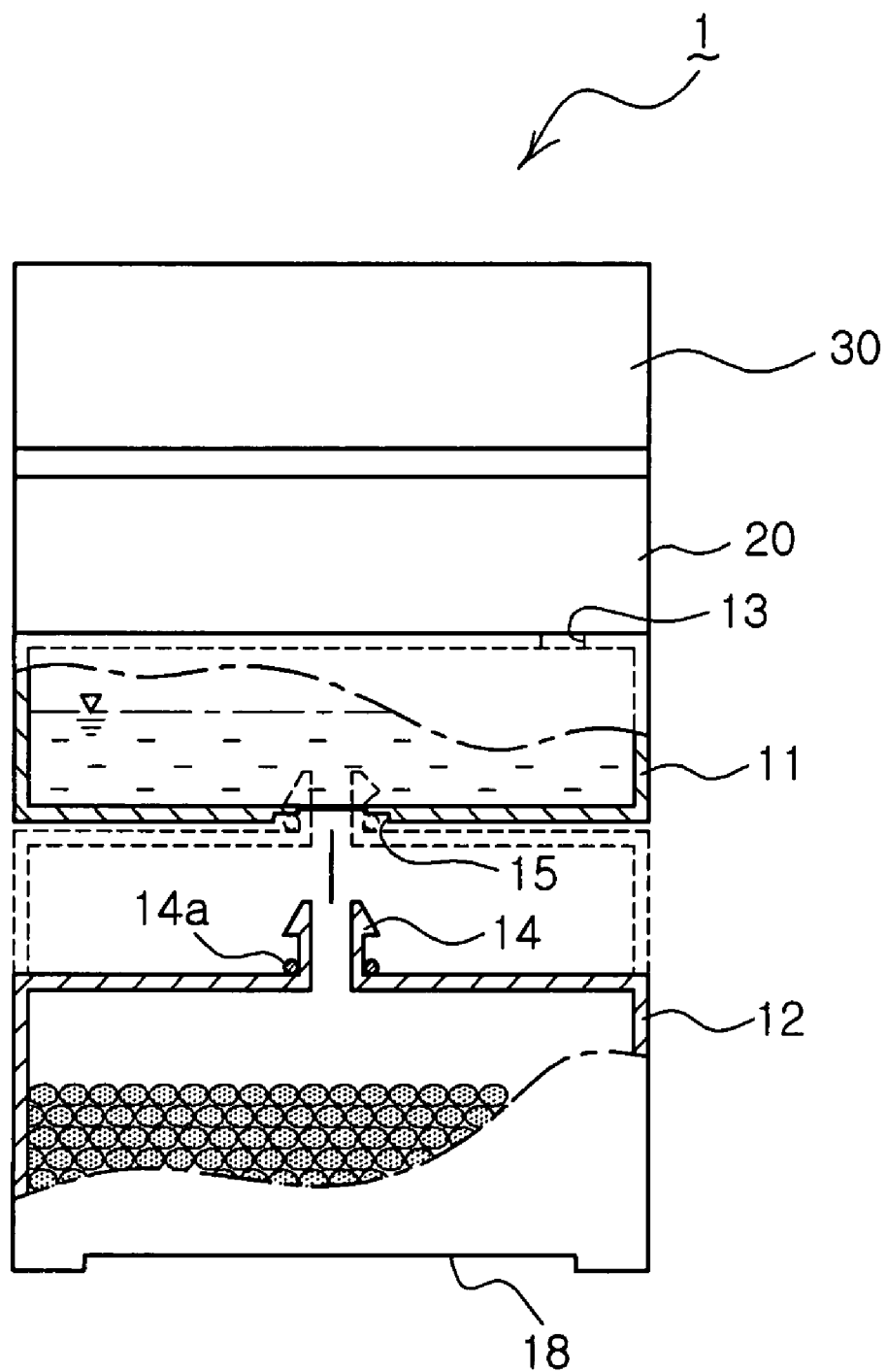
FIG. 3 is a view illustrating a state of joining a first chamber to a second chamber employed by the fuel cell of FIG. 1.

FIG. 1 is an exploded perspective view illustrating a fuel cell having a hydrogen storage tank 1 according to the present invention, FIG. 2 is an assembly view illustrating the fuel cell 1, and FIG. 3 is a view illustrating a state of joining a first chamber to a second chamber employed by the fuel cell 1.

Referring to FIGS. 1 through 3, the fuel cell 1 according to the present invention includes a hydrogen generator 10, a hydrogen storage 20 and a power generator 30.

In the hydrogen generator 10, a certain amount of alkaline solution with an alkaline catalyst for hydrogen generation dissolved in water and a certain amount of metal powder for hydrogen generation are contained, respectively, to generate hydrogen from a chemical reaction between them.

In such a hydrogen generator 10, the certain amount of alkaline solution and the certain amount of metallic powder may be stored separately, so that when it is desired to generate hydrogen, they are allowed to come in contact with each other and be mixed to result in a chemical reaction for hydrogen generation.

Therefore, the hydrogen generator 10 has a first chamber 11 and a second chamber 12, each having a predetermined inner space, stacked on each another.

The first chamber 11 contains a certain amount of alkaline solution with the alkaline catalyst dissolved in water, and has a hydrogen outlet 13, through which high-pressure hydrogen generated is exhausted, formed through an outer surface thereof, corresponding to the hydrogen storage 20.

The second chamber 12 is filled with a certain amount of metallic powder for generating hydrogen from a chemical reaction with the alkaline solution, and has an insertion protrusion 14 formed on an outer surface thereof, corresponding to the first chamber. The insertion protrusion 14 of the second chamber 12 is inserted into the first chamber 11 by force when the second chamber 12 is assembled with the first chamber 11 so that the alkaline solution in the first chamber 11 is guided and injected into the second chamber 12.

In addition, the first chamber 11 has a thin film 15, which is opened by force applied to the insertion protrusion 14 when the first chamber 11 and the second chamber 12 are assembled together, formed on an outer surface thereof corresponding to the insertion protrusion 14. The thin film 15 may be formed to have a thickness smaller than that of the surface of the body of the first chamber 11 so that it can be easily destructed by external impact.

In this case, the insertion protrusion 14 has a leading end having a cylindrical hollow shape with a sharp tip. The insertion protrusion is inserted into the first chamber 11 through the thin film 15 to function as a path connecting the first and second chambers 11 and 12, so that the alkaline solution in the first chamber 11 is naturally flown into the second chamber 12 via the insertion protrusion by gravity.

In addition, the leading end of the insertion protrusion 14 may have a stepped portion so that the insertion protrusion may be prevented from slipping out of the first chamber 11 after it is inserted into the first chamber 11. Also, the leading end of the insertion protrusion may have an o-ring member 14a (see FIG. 3) fitted therearound so as to prevent the solution and hydrogen from leaking from the assembled portion of the insertion protrusion 14 and the first chamber 11 when the first and second chambers 11 and 12 are assembled together.

The first chamber 11 is filled with the certain amount of alkaline solution, which is prepared by dissolving a certain amount of water-soluble alkaline catalyst for hydrogen generation in water.

The alkaline catalyst for hydrogen generation includes alkali-based material, which is highly soluble in water and may be at least one of potassium hydroxide, sodium hydroxide, calcium hydroxide and iron hydroxide.

In addition, the second chamber 12 is filled with the certain amount of metallic powder, which may have a spherical particle shape so as to have a larger contact area as possible with the solution to promote the chemical reaction.

The metallic powder for hydrogen generation may be at least one of aluminum, magnesium, silicon and zinc.

The first chamber 11 has the at least one hydrogen outlet 13 functioning as a path, through which the hydrogen generated from the chemical reaction between the alkaline solution and the metallic powder as the alkaline solution inside the first chamber 11 is flown into the second chamber 12. The hydrogen outlet 13 is formed in a portion of the first chamber 11, corresponding to a hydrogen inlet (not shown) formed at a side of the hydrogen storage 20.

In addition, the first chamber 11 and the hydrogen storage 20 may be bonded together via a sealing member (not shown) therebetween so as to prevent the hydrogen generated from the chemical reaction between the alkaline solution and the metallic powder from leaking to the outside.

In addition, the hydrogen outlet 13 may have a vapor-liquid separating film formed of porous polytetra-fluoethylene so as to retain the alkaline solution and the metallic powder while exhausting gaseous hydrogen.

The second chamber 12 may have an inner space at least two times larger than that of the first chamber 11 in order to contain the alkaline solution from the first chamber 11 together with the metallic powder.

The hydrogen storage 20 includes a tank 21 having a hydrogen inlet (not shown) in one side thereof, through which high-pressure hydrogen generated from the chemical reaction between the alkaline solution and the metallic powder is injected by force; and a tank cover 22 sealing the one side of the tank 21 and having a hydrogen outlet.

The tank 21 may be filled with a powder form of hydrogen occlusion metal for occluding high-pressure hydrogen injected by force through the hydrogen inlet or may have a hydrogen occlusion metal coated therein.

A sealing member (not shown) may be provided between the tank cover 22 and the tank 21 so as to prevent hydrogen released from the hydrogen occlusion metal from leaking to the outside.

The tank cover 22 has at least one hydrogen outlet 24, through which the hydrogen released from the hydrogen occlusion metal is exhausted, corresponds to the hydrogen outlet 21a formed in the tank cover 22.

In addition, a heater 23 is installed between the tank 21 and the tank cover 22 to provide heat to the hydrogen occlusion metal to release the hydrogen occluded to the hydrogen occlusion metal. The heater 23 may be formed of heating wires pattern-printed on one of the one side of the tank 21 and the one side of the tank cover 22 according to a previously designed pattern and connected to an external power source to generate resistance heat when power is applied.

In the meantime, the hydrogen occlusion metal provided in the tank 21 may be formed one of a titan-based alloy of iron-titan, a manganese-based alloy of iron-manganese, a magnesium-based alloy of magnesium-nickel and a rare earth-based alloy, and occludes hydrogen to the surface thereof by the chemical reaction with hydrogen taking place on the surface thereof.

Such a hydrogen occlusion metal may occlude hydrogen to the surface thereof by increasing the inner pressure or inner temperature inside the tank, or conversely, may release the hydrogen occluded to the surface thereof by decreasing the inner pressure or inner temperature in the tank.

The power generator 30 receives hydrogen released from the hydrogen occlusion metal in the hydrogen storage 20 to generate electricity.

The power generator 30 may be formed of a unit cell or a stack of the unit cells. Each unit cell may include, for example, a membrane electrode assembly 31 formed of an electrolyte membrane 31a with an anode 31b and a cathode 31c for diffusing gas attached on opposed sides thereof; anode and cathode separators 32 and 33 assembled to opposed sides of the membrane electrode assembly 31 and having a channel 32b through which hydrogen, the fuel gas flows and holes 33b through which air including oxygen flows, respectively; and anode and cathode current collectors 34 and 35 disposed between the separator 32 and the membrane electrode assembly 31 and between the separator 33 and the membrane electrode assembly 31, respectively, to function as collector electrodes of the anode 31b and the cathode 31c.

In addition, the anode separator 32 has a hydrogen inlet 32a in communication with the hydrogen outlet 24 provided in the tank cover 22 of the hydrogen storage 20, and the hydrogen inlet 32a is connected to the channel 32b formed in the anode separator 32.

The anode and cathode current collectors 34 and 35 have a plurality of channels 34a and a plurality of holes 35a formed corresponding to the channel 32b and the holes 33b formed in the anode and cathode separators 32 and 33, respectively.

The hydrogen generator 10, the hydrogen storage 20 and the power generator 30 are stacked on one another so that the hydrogen outlet 13 of the hydrogen generator 10 corresponds to the hydrogen inlet (not shown) formed in the tank 21 of the hydrogen storage 20, and the hydrogen outlet 24 formed in the tank cover 22 of the hydrogen storage 20 corresponds to the hydrogen inlet 32a formed in the anode separator 32 of the power generator 30.

In addition, as shown in FIG. 2, the hydrogen generator 10, the hydrogen storage 20 and the power generator 30 are integrally assembled by a plurality of clips 40. Each of the clips 40 has upper and lower ends fastened to a lower groove 18 formed on a lower surface of the second chamber 12 of the hydrogen generator 10 and to an upper groove 38 formed on an upper surface of the cathode separator 33 of the power generator 30, respectively, exerting strength for integral fixing.

Therefore, hydrogen generated from the hydrogen generator 10 and exhausted through the hydrogen outlet 13 of the first chamber 11 is occluded to the hydrogen occlusion metal and stored in the tank 21 of the hydrogen storage 20, and the hydrogen released from the hydrogen occlusion metal is supplied to the anode through the hydrogen outlet 24 formed in the tank cover 22 and through the hydrogen inlet 32a of the anode separator 32.

In the fuel cell 1 having the above configuration, with the insertion protrusion 14 of the second chamber 12 in correspondence with the thin film 15 of the first chamber 11, the first chamber 11 and the second chamber 12 are assembled in vertical alignment. Then the thin film 15 is destructed by the leading end of the insertion protrusion 14 by the force of assembling the first and second chambers together. As a result, the insertion protrusion 14 is inserted into the first chamber 11 by force, thereby connecting the first and second chambers 11 and 23 via the protrusion insertion 14.

In this case, the alkaline solution filled in the first chamber 11 flows into the second chamber 12 through the cylindrical hollow-shaped insertion protrusion 14 by gravity, thereby coming into contact with the metallic powder for hydrogen generation in the second chamber 12.

Thus, when the water included in the alkaline solution and the metallic powder for hydrogen generation come into contact with each other to result in the chemical reaction, hydrogen is generated by hydrolytic reaction as in equation 1.

In this case, if the metallic powder for hydrogen generation is aluminum, the reaction with water generates hydrogen $H_2$ along with a residual product $Al(OH)_3$, which has low solubility. $Al(OH)_3$ reacts with oxygen and is converted to $Al_2O_3$, which adheres to the surface of the metallic powder for hydrogen generation. This may retard or interrupt generation of hydrogen from the hydrolytic reaction between the metallic powder for hydrogen generation and water.

However, since the alkaline solution includes the alkaline catalyst like sodium hydroxide, the alumina adhering to the surface of the metallic powder is converted to sodium aluminate $NaAlO_2$ from a catalytic reaction by the alkaline catalyst as in following equation 2 and is separated from the surface of the metallic powder, thereby allowing continuous hydrolytic reactions for generating hydrogen.

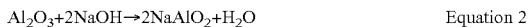
$$Al_2O_3 + 2NaOH \rightarrow 2NaAlO_2 + H_2O \quad \text{Equation 2}$$

In this case, the amount of hydrogen generated from the hydrogen generator 10 is in proportion to a concentration of the alkaline solution in which the alkaline catalyst material is dissolved. Thus, if the concentration of the alkaline solution is lower than 0.1 wt %, the amount of hydrogen generated is too small compared to a given time, and if the density is higher than 0.5 wt %, the amount of hydrogen generated precipitously increases in a relatively short time. Therefore, the concentration of the alkaline solution may be from 0.1 to 0.5 wt %.

In addition, the speed of the reaction between the metallic powder for hydrogen generation and water in the hydrogen generator 10 is in inverse proportion to the particle size of the metallic powder for hydrogen generation. Thus, the smaller the particle size of the metallic powder, the larger the contact area with water containing the alkaline catalyst, expediting the reaction. Conversely, the larger the particle size of the metal powder, the smaller the contact area with water, retarding the reaction.

Therefore, the density of the alkaline catalyst contained in the alkaline solution may be varied to adjust the amount of hydrogen generated, and the particle size of the metallic powder may be varied to adjust the reaction speed and the amount of hydrogen generated.

In the meantime, the hydrogen generated from the hydrogen generator 10 is exhausted at high pressure through the hydrogen outlet 13 formed in the first chamber 11, and the hydrogen exhausted at high pressure is flown into the tank 21 through the hydrogen inlet of the tank 21 of the hydrogen storage 20.

As the tank 21 has a hydrogen occlusion metal provided therein, the hydrogen flown at high pressure occludes to the surface of the hydrogen occlusion metal by the chemical reaction with the surface of the hydrogen occlusion metal and is stored in the hydrogen storage 20.

In addition, to emit the hydrogen occluded to the hydrogen occlusion metal of the hydrogen storage 20 out of the tank, power may be applied to the heater 23 installed between the tank 21 and the tank cover 22 to provided heat to the tank 21, thereby releasing the hydrogen occluded to the hydrogen occlusion metal by increasing the temperature of the hydrogen occlusion metal by the heat and supplying the released hydrogen to the power generator 30 through the hydrogen outlet 24 of the tank cover 22.

Subsequently, the hydrogen released from the hydrogen occlusion metal and exhausted through the hydrogen outlet 24 formed in the tank cover 22 is supplied to the anode through the hydrogen inlet 32a of the anode separator 32 in the power generator 30, and the air including oxygen is supplied to the cathode through the holes 33b of the cathode separator 33 in the power generator 30.

The hydrogen and air supplied to the power generator 30 flow, respectively, at opposite sides of the high polymer electrolyte membrane interposed therebetween, and electrochemical oxidation of the hydrogen takes place at the anode as in formula 3, and electrochemical reduction of oxygen takes place at the cathode as in equation 4.

As a result, electricity is generated by the migration of the electrons generated at this time and collected at the anode and cathode current collectors 34 and 35 for use as an energy source.

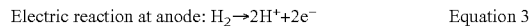
$$\text{Electric reaction at anode: } H_2 \rightarrow 2H^+ + 2e^- \quad \text{Equation 3}$$

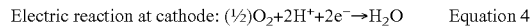
$$\text{Electric reaction at cathode: } (\tfrac{1}{2})O_2 + 2H^+ + 2e^- \rightarrow H_2O \quad \text{Equation 4}$$

According to the present invention set forth above, hydrogen is generated from a chemical reaction between alkaline solution with an alkaline catalyst, for hydrogen generation, dissolved in water and metallic powder for hydrogen generation, the generated hydrogen is occluded to a hydrogen occlusion metal and stored, and the hydrogen released from the hydrogen occlusion metal is received by a power generator to generate electricity. This allows convenient storage of the hydrogen generated from the chemical reaction without a separate external heat source and allows regulated supply of the stored hydrogen, thereby enabling stable generation of electricity at low costs.

Further, since the hydrogen can be stably obtained from hydrolytic reaction between the metallic powder and water without requiring an external heat source for providing heat nor generating carbon monoxide or carbon dioxide, the fuel cell according to the present invention may achieve miniaturization with a reduced volume, easier handling and use. Consequently, the present invention can be applied to mobile terminals, personal digital assistants, portable multimedia players, MP3 players, navigators, and the like.

While the present invention has been shown and described in connection with the exemplary embodiments, it will be apparent to those skilled in the art that modifications and variations can be made without departing from the spirit and scope of the invention as defined by the appended claims.

What is claimed is:

1. A fuel cell having a hydrogen storage tank, the fuel cell comprising:
   a hydrogen generator generating hydrogen by a chemical reaction between an alkaline solution with an alkaline catalyst for hydrogen generation, dissolved in water, and a metallic powder for hydrogen generation;
   a hydrogen storage having a hydrogen occlusion metal to which the hydrogen generated from the hydrogen generator is occluded, to store hydrogen; and
   a power generator receiving the hydrogen released from the hydrogen occlusion metal by heat provided to the hydrogen occlusion metal and generating electricity,
   wherein the hydrogen generator, the hydrogen storage tank, and the power generator are stacked on one another and are integrally assembled by a plurality of clips, each of which has lower and upper ends fastened to a lower groove formed on a lower surface of the hydrogen generator and to an upper groove formed on an upper surface of the power generator, respectively, exerting strength for integral fixing.

2. The fuel cell of claim 1, wherein the hydrogen generator comprises:
   a first chamber filled with the alkaline solution with the alkaline catalyst dissolved in water, the first chamber having a hydrogen outlet formed in an outer surface thereof, corresponding to the hydrogen generator; and
   a second chamber filled with a metallic powder for hydrogen generation, the second chamber having an insertion protrusion inserted into the first chamber when assembled with the first chamber.

3. The fuel cell of claim 2, wherein the first chamber has a thin film formed in an outer surface thereof corresponding to the insertion protrusion, the thin film penetrated by force applied to the insertion protrusion.

4. The fuel cell of claim 1, wherein the alkaline catalyst is at least one selected from a group consisting of potassium hydroxide, sodium hydroxide, calcium hydroxide and iron hydroxide.

5. The fuel cell of claim 1, wherein the metallic powder for hydrogen generation is at least one selected from a group consisting of aluminum, magnesium, silicon and zinc.

6. The fuel cell of claim 2, wherein the hydrogen outlet has a vapor-liquid separation film formed therein.

7. The fuel cell of claim 1, wherein the hydrogen storage comprises:
   a tank having a hydrogen inlet formed in one side thereof, the hydrogen inlet through which high-pressure hydrogen generated from the hydrogen generator is injected by force;
   a tank cover sealing the one side of the tank and having a hydrogen outlet formed thereon; and
   a heater installed between the tank and the tank cover and providing heat to the hydrogen occlusion metal.

8. The fuel cell of claim 7, wherein the heater is formed of heating wires pattern-printed on one of the one side of the tank and one side of the tank cover and connected to an external power source to generate resistance heat.

9. The fuel cell of claim 1, wherein the power generator comprises at least one unit cell, the unit cell comprising:
   a membrane electrode assembly formed of an electrolyte membrane with an anode and a cathode attached to opposed sides thereof;
   anode and cathode separators attached to opposed sides of the membrane-electrode assembly, respectively, the anode and cathode separators having a channel through which hydrogen flows and holes through which air including oxygen flows, respectively; and
   anode and cathode current collectors disposed between the anode separator and the membrane-electrode assembly and between the cathode separator and the membrane-electrode assembly, respectively.

* * * * *